May 26, 1953 H. E. BALSIGER 2,639,562
PRECISION LOCATING DEVICE
Filed Feb. 9, 1950 2 Sheets-Sheet 1
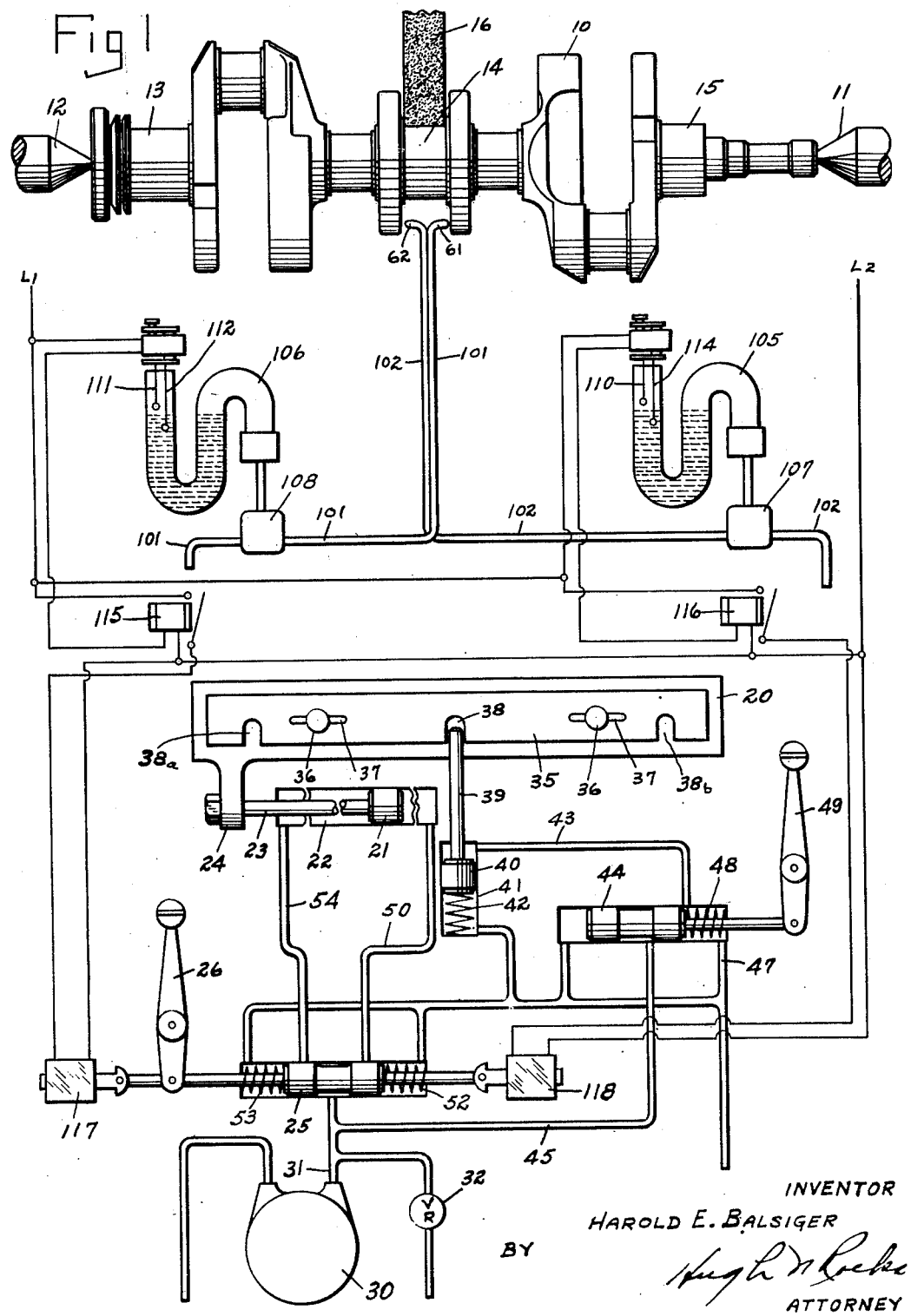
INVENTOR
HAROLD E. BALSIGER
BY
ATTORNEY

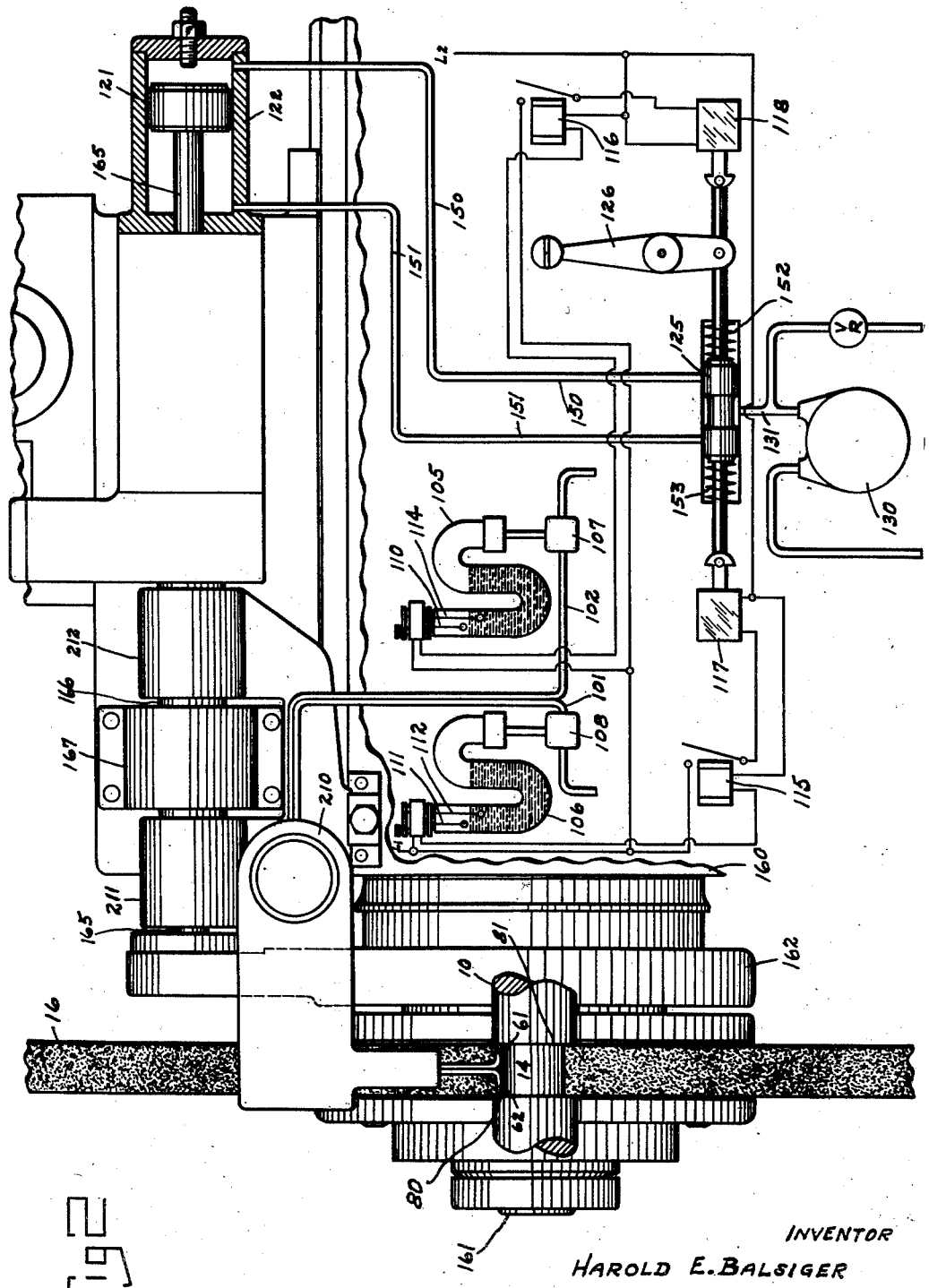

Patented May 26, 1953

2,639,562

UNITED STATES PATENT OFFICE 2,639,562

PRECISION LOCATING DEVICE

Harold E. Balsiger, Waynesboro, Pa., assignor to Landis Tool Company, Waynesboro, Pa.

Application February 9, 1950, Serial No. 143,326

9 Claims. (Cl. 51—165)

This invention relates to apparatus for use in connection with grinding or machining of cylindrical portions of a work piece between flanges, cheeks, shoulders or other portions of greater diameter adjoining the surface to be machined.

More particularly, this invention relates to apparatus for relatively positioning successive portions of a work piece and a cutting tool when the machining must be done simultaneously on the spaced shoulders or flanges as well as the cylindrical surface. This requires that the portion to be ground or machined and the tool must be accurately centered relative to one another so that the tool will remove an approximately equal amount of stock from each shoulder. When so centered, each portion will be accurately positioned with relation to other similar portions on the same work piece.

When a rough cast or forged crankshaft is turned or milled, the spacing between bearing surfaces is not held to close limits. When it is placed in a crankpin grinder having a spacing bar and plunger, the spacing of the pin bearings usually does not agree exactly with the notches on said spacing bar and a relative axial adjustment must be made between the work and the grinding wheel so that the grinding wheel will grind equally on each shoulder.

It is, therefore, an object of this invention to provide means for effecting relative axial positioning between the tool and the flanges or shoulders of a work piece.

It is a further object to provide a preliminary and approximate positioning operation supplemented by a more exact positioning operation.

A further object is to locate successively a series of portitons on a work piece in operative relation to a cutting tool.

The drawings show a diagrammatic arrangement of a work piece in the form of a crankshaft having a plurality of spaced portions to be ground, as well as hydraulic and electrical systems for causing a locating movement between the work and the tool, and the apparatus for accurately locating said parts after each indexing operation.

Figure 1 is a combined hydraulic and electrical diagram.

Figure 2 is a front elevation, partly in section, showing the invention applied to the grinding wheel instead of the work carriage.

Numeral 10 indicates a crankshaft mounted on footstock center 11 and headstock center 12 for grinding the main bearings 13, 14 and 15. The crank could just as well be mounted in eccentric clamping fixtures which are well-known in the art for grinding the crankpins. The locating apparatus would function in the same manner to locate the crankpins relative to grinding wheel 16 as it does to locate the main bearings.

Crank 10 and centers 11 and 12 are mounted on carriage 20 in a manner well-known in the art but not disclosed in the drawings.

Carriage 20 may be moved endwise by means of a piston 21 and cylinder 22 connected by piston rod 23 to a portion 24 in the lower side of said carriage. Fluid under pressure is supplied alternately to opposite ends of cylinder 22 by means of a reversing valve 25. Said valve may be actuated automatically in a manner such as disclosed in Patents 2,105,841 and 2,323,189. However, for the purpose of illustration, the lever 26 is sufficient.

Fluid under pressure is supplied to valve 25 by pump 30 through line 31. A relief valve 32 connected to the outlet of said pump serves to regulate the pressure in the hydraulic system. The above-mentioned patents also show automatic means for indexing a work carriage. It is sufficient for our purpose to show spacing bar 35 adjustably mounted on carriage 20 by means of screws 36 in longitudinal slots 37 in said spacing bar.

On the lower side of said spacing bar is a plurality of notches 38 spaced to correspond to the spacing of the portions to be ground on the work piece. A plunger 39 in the form of a piston rod having a piston 40 attached thereto and operable in a cylinder 41 is held in engagement with the spacing bar 35 by means of a spring 42. Said plunger may be withdrawn from said spacing bar by fluid under pressure directed through line 43 from valve 44.

Said fluid under pressure is supplied to said valve frome line 31 through line 45. In the drawing, valve 44 is in a position to direct fluid from piston 40 through line 43 to exhaust passage 47. Valve 44 is held in this position by spring 48. Said valve may be moved by lever 49 to connect pressure line 45 with line 43.

The means for determining the relative axial positions of the grinding wheel 16 and the spaced flanges or cheeks of the portion to be ground consists of a pair of nozzles 61 and 62 which are directed against each of said cheeks. Said nozzles may be supported for movement into and out of operative position in any suitable manner, for example, means similar to that disclosed in copending application 129,422, filed November 25, 1949, now Patent No. 2,559,431 dated July 3, 1951.

Air under moderate pressure is supplied to said nozzles from any suitable source through lines 101 and 102 respectively. Inserted in each of said lines is a device 107 or 108, sometimes known as a venturi. The structure and function of this device is disclosed more in detail in Patent 2,001,447, granted May 14, 1935.

Connected to each of said devices are manometer tubes 105 and 106, each having a body of mercury therein. Vertically spaced electrical contacts 111 and 112 in tube 106, and contacts 110 and 114 in tube 105 serve to complete an electrical circuit when the pressure on the mercury is such as to raise the column in the portion of the tube in which the contacts are located. Said contacts are in circuit with relays 115 and 116, which in turn complete circuits to solenoids 117 and 118. Said solenoids are attached to opposite ends of reversing valve 25. Said valve directs fluid under pressure from pump 30 and line 31 alternately through lines 50 and 54 to opposite ends of cylinder 22.

It should be understood that the nozzles 61 and 62 on the mercury switches in manometer tubes 105 and 106 are used primarily for illustrative purposes. Obviously, micro-switches such as those shown in co-pending application 129,422 could be mounted in place of nozzles 61 and 62 and perform the same function.

Figure 2 discloses an alternate form of my invention. In this case the precision adjusting movement is applied to the grinding wheel rather than to the work carriage. Grinding wheel 16 is rotatably supported in wheelbase 160 on a spindle 161. Said spindle is rotatably mounted in suitable bearings in said wheelbase. A slight amount of endwise movement is provided so that said spindle and grinding wheel may be adjusted axially relative to the work piece.

The structure of this form of my invention is similar to that disclosed in co-pending application Serial No. 129,422, filed November 25, 1949. The details of the structure are described in the copending application, and the description will not be repeated herein except insofar as it is essential to the explanation of this invention.

Nozzles 61 and 62 are mounted on a bracket 210 which has a yoke portion having spaced members 211 and 212 secured to a sleeve 166. Said sleeve is rotatably mounted in a bearing in bracket 167 attached to wheelbase 160. The other end of said sleeve, which is not shown here, is mounted in a similar bearing. Thus, the bracket 210 may be swung about sleeve 166 to move the nozzles 61 and 62 toward or away from operative position. Here again, micro-switches may be substituted for the nozzles 61 and 62.

A shaft 165 passes through sleeve 166 and has mounted at the left-hand end thereof a bracket 162 which engages the rotatable portion of the wheel mounting in any suitable manner for the purpose of effecting a slight endwise movement thereof. The other end of said shaft forms a piston rod for piston 121 in cylinder 122.

Fluid under pressure is supplied to said cylinder from pump 130, line 131, and valve 125 through either of the lines 150 or 151. Constant pressure is maintained on said fluid by relief valve 132. Valve 125 may be shifted manually by means of a lever 126 or by one or the other of solenoids 117 and 118. Said valve is normally held in central position by means of springs 152 and 153.

*Operation*

For the purpose of illustration, we have used as a work piece, crankshaft 10 mounted on centers 11 and 12 for grinding main bearings 13, 14 and 15. The locating device would work just as well if said crank was mounted eccentrically for grinding the crankpins.

Assuming that main bearing 13 has been ground, the operator shifts lever 49 to the left to supply fluid under pressure from line 45 to line 43, and the plunger end of cylinder 41 to shift piston 40 and plunger 39 downwardly against spring 42. Plunger 39 is thus withdrawn from notch 38a. Lever 26 is shifted to the left and valve 25 to the right to connect line 31 through line 50 to the head end of cylinder 22. As soon as carriage 20 begins to move, lever 49 may be released and valve 44 will be moved to the left by spring 48 to a position to connect line 43 with exhaust line 47. Spring 42 will then raise piston 40 and plunger 39 into engagement with spacing bar 35 so that, as soon as notch 38b moves into position, plunger 39 will enter said notch and stop the carriage 20 in approximate position to grind bearing 14. When the carriage 20 is traversing from right to left and the plunger 39 drops into notch 38, the movement of carriage 20 causes the right-hand side of said notch to engage said plunger. When the carriage is moving from left to right, the movement is such that the left-hand side of each notch engages the plunger 39.

As soon as the carriage 20 stops, the operator may release lever 26; and valve 25 will be returned to neutral position by spring 52. A similar spring 53 will move said valve to neutral position from the oposite direction.

When carriage 20 comes to rest, nozzles 61 and 62 are moved into operative relation to the spaced cheeks of the work piece. When the carriage 20 is traversing from right to left, nozzle 61 is closer to the corresponding cheek than nozzle 62, since the carriage is stopped by the right side of notch 38 engaging plunger 39. The flow of air from said nozzle will thus be restricted and pressure will be built up in tube 106 so that the mercury column will rise and complete a circuit through contacts 111 and 112 to energize relay 115.

Said relay will close a circuit to solenoid 117 and shift valve 25 to the left against spring 53. In this position, said valve will direct fluid from line 31 through line 54 to the left end of cylinder 22 to move piston 21 and carriage 20 to the right. This movement will result in increasing the space between nozzle 61 and the corresponding cheek, thus reducing the pressure in the manometer tube 106 so that the mercury column drops, opening the circuit between contacts 111 and 112 and deenergizing solenoid 117. Spring 53 will then shift valve 25 back to neutral position and stop the movement of carriage 20 with the cheeks of the work piece in substantially exact alignment with the grinding wheel.

When carriage 20 is moving from left to right, nozzle 62 will be closer to the corresponding cheek than nozzle 61 since the carriage is stopped by the left side of the notch engaging plunger 39. In this case, manometer tube 105, relay 116 and solenoid 118 would function in the same manner as the corresponding elements associated with nozzle 61 to adjust the carriage 20 in a direction from right to left until the work piece is properly located, at which time the carriage would be stopped.

In actual practice, the carriage is usually traversed in only one direction for grinding; and thus the out of line condition between the work and the grinding wheel is always in the same direction. Under such circumstances, only one nozzle along with manometer tube, relay and solenoid is necessary. However, the use of oppositely directed nozzles is desirable for two reasons: First, in making the final adjustment, there is a chance that the carriage might move too far in the direction of adjustment, in which case the opposite nozzle would function and the carriage would be reversed to the desired position. Secondly, for some types of work, it might be desirable to perform successive grinding operations, beginning at either end of the work piece, in which case one nozzle would function during movement in one direction and the other nozzle would function during movement in the opposite direction.

In the form of the invention shown in Figure 2, when carriage 20 and work piece 10 are moved to position bearing 14 relative to the grinding wheel 16, approximate location is effected when plunger 39 drops into notch 38. If the carriage is moving from right to left, the right-hand side of the notch will be closer to plunger 39 than the left-hand side of said notch. Also, when nozzles 61 and 62 are swung into operative position, the right-hand cheek 81 of the work piece will be closer to the corresponding nozzle 61 than the opposite cheek to its corresponding nozzle. The flow of air from nozzle 61 will be restricted, and the mercury column in manometer tube 105 will be shifted to complete a circuit between contacts 110 and 114. This, in turn, will energize relay 116 to complete a circuit to solenoid 118. Said solenoid, when energized, will shift valve 125 to the right against spring 152 and direct fluid under pressure from pump 130 and line 131 through line 150 to the right-hand end of cylinder 122 to shift piston 121, shaft 165, bracket 162 and wheel 16, along with nozzles 61 and 62, to the left. As soon as nozzle 61 has moved sufficiently to permit a freer escape of air and thus reduce the pressure in manometer tube 105, the mercury column will return to its normal position, opening the circuit between contacts 110 and 114 and thereby deenergizing solenoid 118. Spring 152 will then shift valve 125 to central position, thus stopping the movement of piston 121 with the sides of the grinding wheel 16 in exact alignment with the cheeks 80 and 81 of the work piece. If carriage 20 is moving from left to right, plunger 39 will drop into notch 38 with the left-hand side of said notch adjacent the plunger. The work piece will be slightly off-center to the right, with the nozzle 62 close to the cheek 80. In this case, the mercury column in manometer tube 106 will be shifted to complete a circuit between contacts 111 and 112, energizing relay 115 and solenoid 117 to shift valve 125 to the left against spring 153.

Fluid under pressure from line 131 is directed by said valve through line 151 to the left-hand end of cylinder 122. Piston 121 is thus shifted from left to right along with shaft 165, bracket 162, grinding wheel 116 and nozzles 61 and 62. When nozzle 62 has moved sufficiently to drop the pressure in manometer tube 106, the circuit through contacts 111 and 112 is broken and valve 125 returned to inoperative position by spring 153 to stop the movement of the grinding wheel in alignment with the cheeks 80 and 81.

I claim:

1. In a grinding machine for successively grinding spaced cylindrical portions of a work piece, each having opposed shoulder or flange portions, a grinding wheel, a work support, means for effecting a relative axial movement between said work and said wheel to successively position said cylindrical portions and said grinding wheel, including a spacing bar for one of said members having spaced notches corresponding to the portions to be ground, a plunger for engaging said notches to position said members in approximate operative relation, a work locating device having means cooperating with said shoulder portions for determining the relative position of said shoulder portions and said grinding wheel, and means actuated by said locating device for causing said axial moving means to place said grinding wheel and each of said portions of said work piece successively in substantially exact alignment.

2. In a grinding machine for successively grinding spaced cylindrical portions of a work piece, each having opposed shoulder or flange portions, a wheel support, a grinding wheel rotatably mounted thereon, a work support, means for effecting a relative axial movement between said work and said wheel means to effect said axial movement intermittently to successively position said cylindrical portions and said grinding wheel successively in approximate operative relation, a work locating device having means for cooperating with said shoulder portions for determining the relative position of said shoulder portions and said grinding wheel, and means actuated by said locating device for controlling said axial moving means for placing said grinding wheel and each of said portions of said work piece in substantially exact alignment.

3. In a grinding machine for successively grinding spaced cylindrical portions of a work piece, each having opposed shoulders or flange portions, a wheel support, a grinding wheel rotatably mounted thereon, a work support, means for effecting relative axial movement between said work and said wheel to successively position said cylindrical portions and said grinding wheel in operative relation, including a hydraulic motor attached to said work support, a reversing valve for directing fluid under pressure to drive said motor alternately in opposite directions, means for positioning said work support longitudinally, including a spacing bar on one of said members and means co-acting therewith to locate said cylindrical portions and said grinding wheel in approximate operative relation, means adjacent said shoulder portions for determining the relative axial position of said portions and said grinding wheel, and means actuated by said determining means when said shoulders and said grinding wheel are out of alignment for shifting said reversing valve and thus moving said work support to place said shoulders and said grinding wheel in alignment.

4. In a grinding machine for successively grinding spaced cylindrical portions of a work piece, each having opposed shoulder or flange portions, a wheel support, a grinding wheel rotatably mounted thereon, a work support, means for effecting relative axial movement between said supports, means to successively position said work support and said grinding wheel in approximate relation, means for effecting endwise movement of said grinding wheel, including a motor, a reversing means to drive said motor alternately in opposite directions, means adjacent said opposed shoulders for determining the relative axial positions of said work support and said grinding wheel, and means actuated by said determining means when said work support and said grinding wheel are out of alignment for one of said portions for shifting said reversing means and thus moving said wheel endwise to place said work support and said grinding wheel in alignment.

5. In a machine tool for machining spaced cylindrical portions of a work piece, each having opposed shoulder portions, a work support, a tool support, a cutting tool mounted thereon, means for effecting relative longitudinal movement between said supports to successively position said cylindrical portions and said cutting tool in operative relation, including a spacing bar for one of said supports having spaced notches corresponding to the portions to be ground, a plunger for engaging said notches to position said supports in approximate operative relation, a work locating device having means for cooperating with said shoulder portions, and means separate from said longitudinal moving means and actuated by said locating device to effect a precision adjustment between said supports in each successive position thereof.

6. In a machine tool for machining spaced cylindrical portions of a work piece, each having opposed shoulder portions, a work support, a tool support, a cutting tool mounted thereon, means for effecting relative longitudinal movement between said supports to successively position said cylindrical portions and said cutting tool in operative relation, including a spacing bar for one of said supports having spaced notches corresponding to the portions to be ground, a plunger for engaging said notches to position said supports in approximate operative relation for each of said portions, a work locating device having means for cooperating with said shoulder portions, and means actuated by said locating device to effect a precision adjustment of said tool relative to said shoulders.

7. In a grinding machine for successively grinding spaced cylindrical spaces of a work piece, each having opposed shoulders or flange portions, a wheel support, a grinding wheel rotatably mounted thereon, a work support, means for effecting relative axial movement between said work and said wheel to successively position said cylindrical portions and said grinding wheel in operative relation, including a motor connected to one of said supports, reversing means to drive said motor alternately in opposite directions, means for relatively positioning said work support and said wheel support longitudinally, including a spacing bar on one of said members and means co-acting therewith to locate each of said cylindrical portions and said grinding wheel in approximate operative relation, means removably positioned in axially fixed relation with said grinding wheel for determining the relative axial position of said shoulder portions and said grinding wheel, and means actuated by said determining means when said work support and said grinding wheel are out of alignment for one of said portions, for effecting operation of said axial moving means to place said work support and said grinding wheel in exact operative relation.

8. In a grinding machine for successively grinding spaced cylindrical portions of a work piece, each having opposed shoulders or flange portions, a wheel support, a grinding wheel rotatably mounted thereon, a work support, means for effecting relative axial movement between said work and said wheel, including a motor connected to said support, reversing means to drive said motor alternately in opposite directions, means for relatively positioning said work support and said wheel support longitudinally, including a spacing bar on one of said members and means co-acting therewith to locate said cylindrical portions and said grinding wheel in approximate operative relation, means removably positioned in cooperative relation with said shoulder portions for determining the relative axial position of said portions and said grinding wheel, and means actuated by said determining means when said work support and said grinding wheel are out of alignment for a specific portion of said work piece for effecting operation of said axial moving means to place said work support and said grinding wheel in exact operative relation.

9. In a grinding machine for successively grinding spaced cylindrical portions of a work piece, each having opposed shoulder or flange portions, a wheel support, a grinding wheel rotatably mounted thereon, a work support, means for effecting a relative axial movement between said work and said wheel, means to effect said axial movement intermittently to successively position said cylindrical portions and said grinding wheel in approximate operative relation, a work locating device having means for cooperating with said shoulder portions for determining the relative position of said shoulder portions and said grinding wheel, and means actuated by said locating device for placing said grinding wheel and each of said portions of said work piece in substantially exact alignment.

HAROLD E. BALSIGER.

References Cited in the file of this patent
UNITED STATES PATENTS

| Number | Name | Date |
|---|---|---|
| 2,264,160 | Flygare et al. | Nov. 25, 1941 |
| 2,284,606 | Flygare et al. | May 26, 1942 |
| 2,544,156 | Hathaway | Mar. 6, 1951 |
| 2,559,431 | Hollengreen et al. | July 3, 1951 |